INVENTOR
JOHN R. LYNN
ATTORNEYS

INVENTOR
JOHN R. LYNN
ATTORNEYS

May 23, 1972  J. R. LYNN  3,664,732
METHOD FOR EXAMINATION OF VISUAL FIELDS
Filed Feb. 2, 1970  7 Sheets-Sheet 4

INVENTOR
JOHN R. LYNN

ATTORNEYS

May 23, 1972    J. R. LYNN    3,664,732
METHOD FOR EXAMINATION OF VISUAL FIELDS
Filed Feb. 2, 1970    7 Sheets-Sheet 6
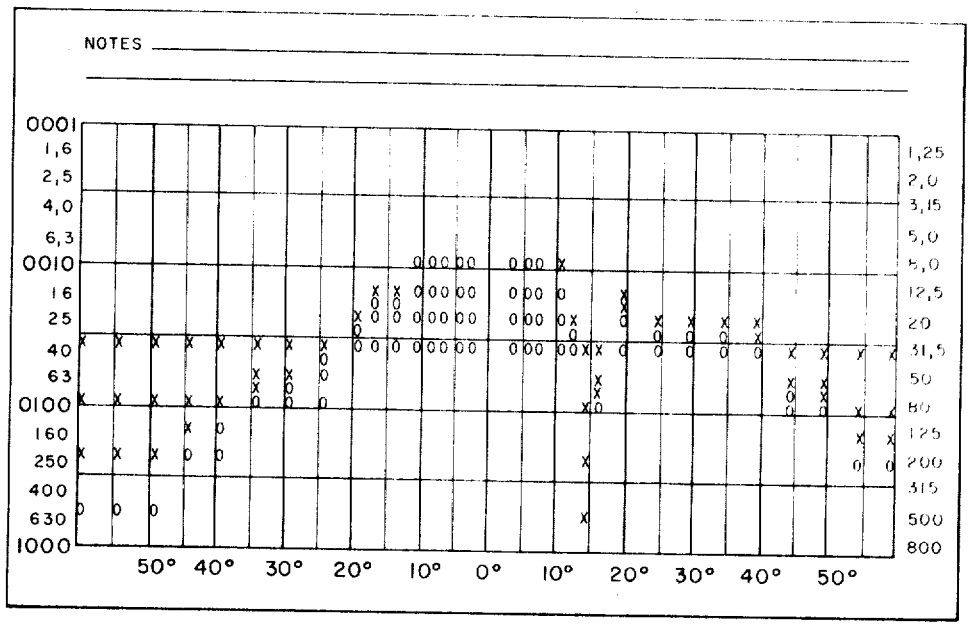
FIG. 9
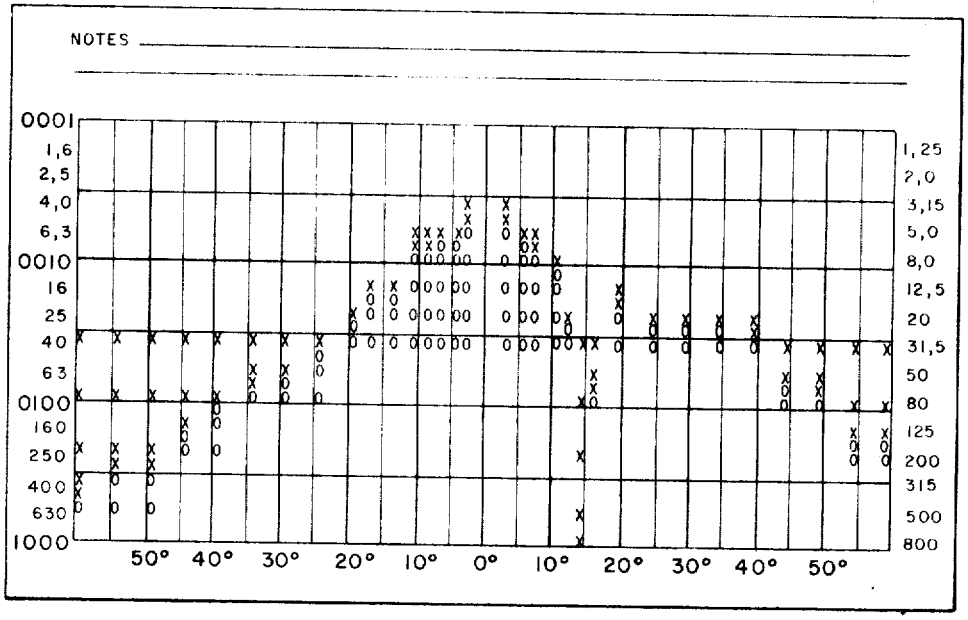
FIG. 10
INVENTOR
JOHN. R. LYNN
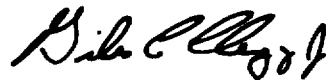
ATTORNEYS

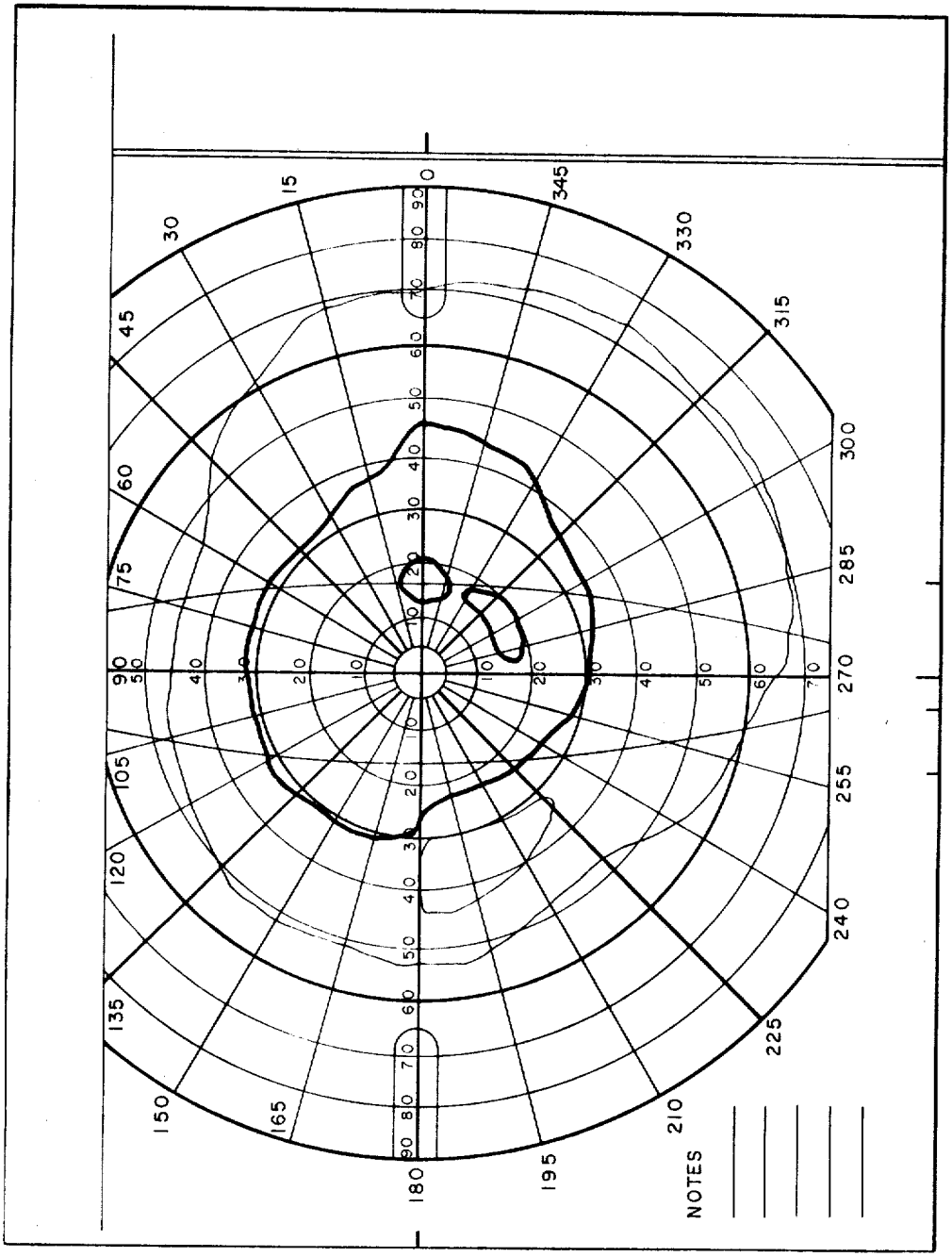

3,664,732
Patented May 23, 1972

3,664,732
METHOD FOR EXAMINATION OF VISUAL FIELDS
John R. Lynn, 10001 Preston Road, Dallas, Tex. 75230
Filed Feb. 2, 1970, Ser. No. 7,601
Int. Cl. A61b 3/02, 3/10
U.S. Cl. 351—39    12 Claims

ABSTRACT OF THE DISCLOSURE

A method for testing the visual field of a subject wherein stationary, momentary spots of light of predetermined stimulus value are presented at predetermined locations on a test field of constant brightness in a sequence not readily predictable by the subject. Information is obtained from the subject as to whether the subject perceived the stimulus as each spot was presented. Additional stationary, momentary spots of light are then presented at the predetermined locations in an unpredictable sequence with the additional spots being of predetermined stimulus values based upon the subject's responses to previous spots of light at the same locations. Additional stationary, momentary spots of light are presented until at each location either the limits of the apparatus are reached or a threshold level is determined.

BACKGROUND OF THE INVENTION

Potentially, one of the most useful visual tests for the ophthalmologist, the neurosurgeon and others interested in diseases affecting the brain and visual system is a test of the field of vision of the subject. Visual fields are important because the pattern of deviation from their normal shape may localize the lesion to a certain part of the eye or brain, help determine the activity and prognosis of the disease process causing the defect and even suggest the precise diagnosis in some instances. All seven of the major causes of organic blindness in the United States of America (glaucoma, cataract, diabetes, other vascular diseases, uveitis, retinal detachment, senile macular degraduation) have characteristic patterns of defect in the visual field, often showing these defects early in the disease process.

Visual fields are useful to the general practitioner in the management of diabetes, in the diagnosis of unexplained headaches, in the follow-up of vascular diseases, or in the diagnosis of blurred vision. At times it is even possible to obtain information from visual fields which not have been possible otherwise, such as the diagnosis of certain brain tumors and, particularly, tumors of the pituitary gland.

One of the most important values of visual field testing is the ability of the visual field tests to indicate the progression or regression of a disease process. This can serve as the basis for changes in treatment or reassurance that the current therapy is effective. For this reason, it is essential that visual fields be performed in such a manner that they can be reproduced reliably from one day to another, from one testing session to another, and from one geographic location to another.

The activity of a disease process can be indicated by the distance between isopter lines provided in a plot of the visual field test. If these isopter lines are far apart, a three dimensional representation of the flat visual field has a shallow slope. A shallow slope in the area of a defect usually indicates an area of edema or inflammation within the eye or visual pathway. On the other hand, a very steep slope in the area of a defect, indicated by the isopters being close together, usually signifies an infarct scar or some chronic disease process. These same changes of slope in the visual field carry prognostic as well as diagnostic significance. A shallow slope indicates acute inflammation or partial ischemia, etc. and provides hope of recovery if the cause of the defect is removed. A steep slope indicates the presence of a scar, infarct, etc. which implies a poor chance of recovery.

The site of a disease process within the brain may often be localized through visual field testing, for visual nerve fibers are present throughout a large part of the brain, from front to back. A disease such as a tumor or a stroke often impinges on these nerve fibers, producing defects in the visual fields of the eyes. The patterns of these defects are characteristic because fibers from the eye pass through known tracts in the brain. That is, fibers from the upper part of the eye remain in the upper visual pathway and the visual fibers from the inner half of each eye cross over to the opposite side of the brain. The fibers from corresponding points in the two eyes gradually approach one another until they merge at the visual cortex in the back of the brain.

To perform accurate visual field testing and obtain reproducible results for comparison with subsequent tests currently requires a perimeter machine and a skilled examiner. Accordingly, testing of visual fields is relatively expensive. Another object to standard testing of visual fields is the long time required to perform a test during which time the subject may become uncomfortable, bored or tired and may shift his eyes. Accurate results may not be obtained because of these problems and because of inherent defects in the standard testing of visual fields.

Testing of visual fields on a perimeter machine may be performed by two methods generally termed "kinetic" and "static." The kinetic method uses spots of known size and brightness which are moved from the edge of the perimeter machine inward until the subject signals that he sees them. The smaller, dimmer tests are normally visible over a smaller central area in comparison with the larger, brighter tests which may be seen over a lateral expanse of about 216° using both eyes or 170° with a single eye. This method is relatively fast, but it has a disadvantage that the spot moves as much as 5° during the time after the subject sees the spot until he can signal that he sees it. This time lag, which depends upon the subject's reaction time, is a source of some inaccuracy and unreproducible results. Also, unless many isopters are obtained, kinetic testing frequently misses relatively small blind spots which may be present within the visual field.

The static method uses spots that do not move, but size and brightness are increased at stationary points until the patient sees the test. This method generally gives more accurate results than the kinetic method, but it too has many drawbacks. The presentation of spots which are just a little too dim or too small to be recognized have a definite effect on the eye, causing the retina in back of the eye to bleach in the area where the test spot was focused. The bleaching process is commonly referred to as "local adaptation." Repeated testing of the same spot at very frequent intervals may, therefore, lead the examiner to believe the area in question has relatively poor vision. Also although the subject is supposed to hold his eye stationary and directed at a selected point during the test, he may shift his fixation, allowing the test spot to fall on unbleached retina where the test is seen much better. This source of inconsistency from the bleaching effect is eliminated in routine manual testing by rest periods during the test. However, these pauses prolong the test time significantly. To do a full visual field by static perimety would require approximately six weeks. Thus, the usefulness of static testing is generally limited to studies of specific areas of the visual field that the physician identifies by other tests and then decides to watch very closely.

SUMMARY OF THE INVENTION

The present invention provides an improved method for testing the visual field in which spots that do not move are used but which is capable of being performed much more rapidly than conventional static testing of visual fields. The method of the present invention is readily adaptable to computer control. The method of the present invention provides the advantages of speed characteristic of the kinetic method of visual field testing and the advantage of accuracy associated with static visual field testing.

In accordance with the principles of the present invention, stationary momentary spots of lights of predetermined stimulus value are presented in sequence to the subject at predetermined locations on a test field which is of constant brightness. By presenting stationary spots in a sequence which is not predictable by the subject, and which is suitably random, many advantages are obtained. Most importantly, several tests can be presented to the subject between tests at any particular location, minimizing or eliminating the problems due to local adaptation or "bleaching" of the retina. Thus, the time required to determine thresholds at a number of predetermined locations is reduced substantially. Further, the subject can not anticipate the point at which a stimulus will be presented and many psychological problems are eliminated.

Information is obtained from the subject when the subject receives a stimulus. Incorrect subject responses are produced when rapid, sequential testing becomes rhythmic so that the subject tends to respond automatically without seeing the test object.

Based upon the subject's response to previous spots of light at each location, additional stationary momentary spots of light are presented at each of the predetermined locations in a random or apparently random sequence. Thus, if the subject failed to perceive a stimulus which was presented at a given location, the light spot next presented at that particular location would be of a greater stimulus value. It will be noted in this regard that the stimulus value is a function of intensity, size and duration of the spot. On the other hand, if the subject did perceive a stimulus at a particular location as it was presented, the next spot of light presented at that location would be of reduced stimulus value. This process is continued until the limits of the apparatus are reached or a threshold level is determined for each of the predetermined locations.

In accordance with the preferred embodiment of the invention, the spots of light presented are of a stimulus value selected from a plurality of predetermined discrete stimulus values. It has been found that by reducing the stimulus value two discrete steps when a spot of light is perceived and increasing the stimulus value four steps when a spot of light is not perceived until at a particular location spots of light of different stimulus value are both perceived and not perceived, a rough indication of the threshold levels can be determined with a reduced number of presentations. Thereafter, the threshold level at the particular location can be obtained by presenting one or more spot, each of a stimulus value which is the mean of the dimmest spot seen and the brightest spot not seen, until the threshold level is determined. Also, the number of presentations can be substantially reduced in normal subjects by choosing the initial presentation to lie along the expected curve for normal eyes. Data representing the threshold levels at each of the determined locations can be used for plotting curves or graphs to display the information in a form readily understood by the clinician.

DESCRIPTION OF THE DRAWINGS

Many objects and advantages of the invention will become apparent to those skilled in the art as the detailed description of preferred embodiments of the invention unfold in conjunction with the appended drawings wherein like reference numerals denote like parts and in which:

FIGS. 6 through 11 illustrate accumulation of data in the course of practice of the present invention;

FIG. 12 illustrates the manner in which information can be displayed in a chart of the type shown in FIG. 4; and, FIG. 13 is a block diagram of computer controlled apparatus suitable for use in the practice of the invention.

Figure 1:
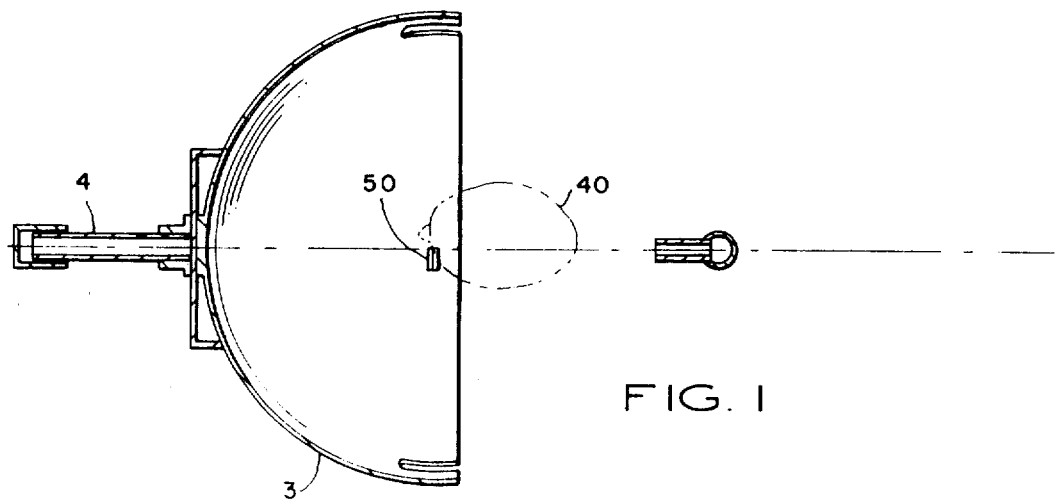
FIG. 1 is a plan view of a Goldmann projection perimeter.
Figure 2:
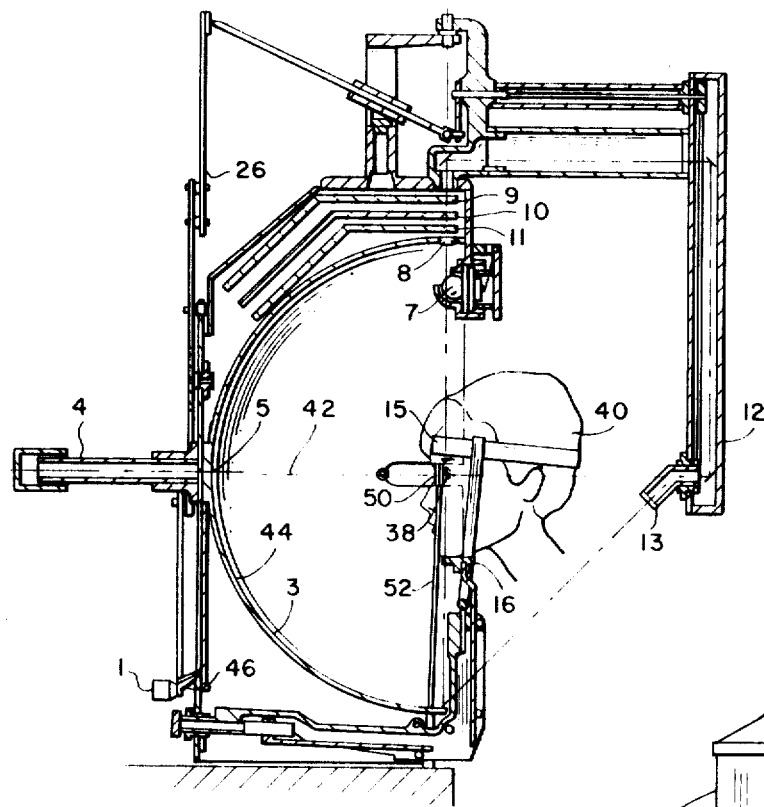
FIG. 2 is a side elevation view of the perimeter machine of FIG. 1.
Figure 3:
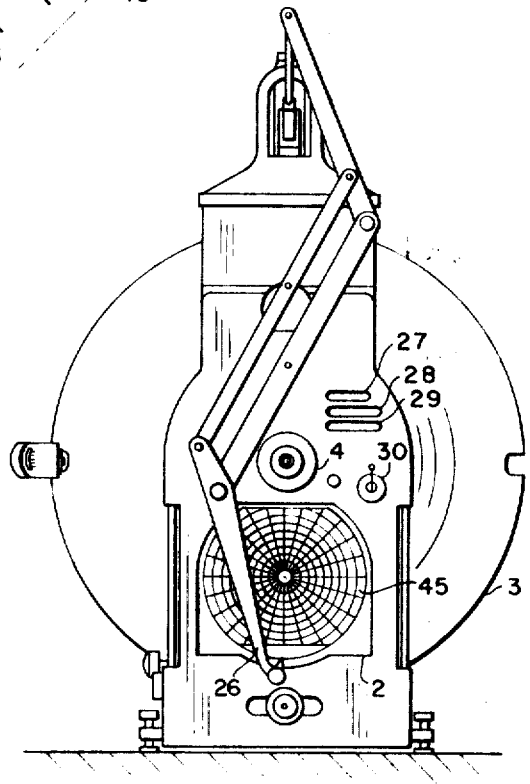
FIG. 3 is a rear elevation view of the apparatus shown in FIG. 1.

Referring now to the drawing, there is shown in FIGS. 1 through 3 a conventional Goldmann projection perimeter of the type well known in the art. The apparatus includes a large hemisphere 3 on which spots of light are to be displayed. A telescope 4 is provided which the examiner can observe an eye 38 of the subject 40 being tested. The subject 40 is positioned with his eye lying directly along the axis 42 of the telescope which axes passes through the point 5. It is important that the subject direct his attention to the point 5 at all times. In order to position the subject and his eye along the axis of the telescope, a handband 15 and a chin rest 16 are provided. Incandescent lamp 7 is a source of light for both illuminating the inner surface 44 of the hemisphere 3 which functions as a test field and providing light which is intensified by the concentrating lens 8 and then projected by the projecting lens 13 of the projector 12 onto the surface 44. Aging of the lamp will affect light furnished to the projector and the test field in the same manner and to an equal degree. The apparatus also includes a chart holder 2 adapted to hold a chart 45 of the type shown in FIG. 4 of the drawings. There is also provided a pantograph 26 controlled by a knob or handle 1. When the knob 1 is moved to position the pointer 46 at a selected point on the chart 45, pantograph 26 will cause the projector 12 to move to position to cause a spot of light to be projected onto the surface 44 at the corresponding point. Levers 27 and 28 are provided for controlling filters 9 and 10 which control intensity of the spot of light. Lever 29 controls a diaphram 11 which controls the spot size. A shutter switch 30 is operable by the technician to present a spot of light to the subject's view only when the technician desires to do so and without knowledge of the subject. A holder 50 for a pair of refractive trial lenses is adjustably supported by rod 52.

Figure 4:
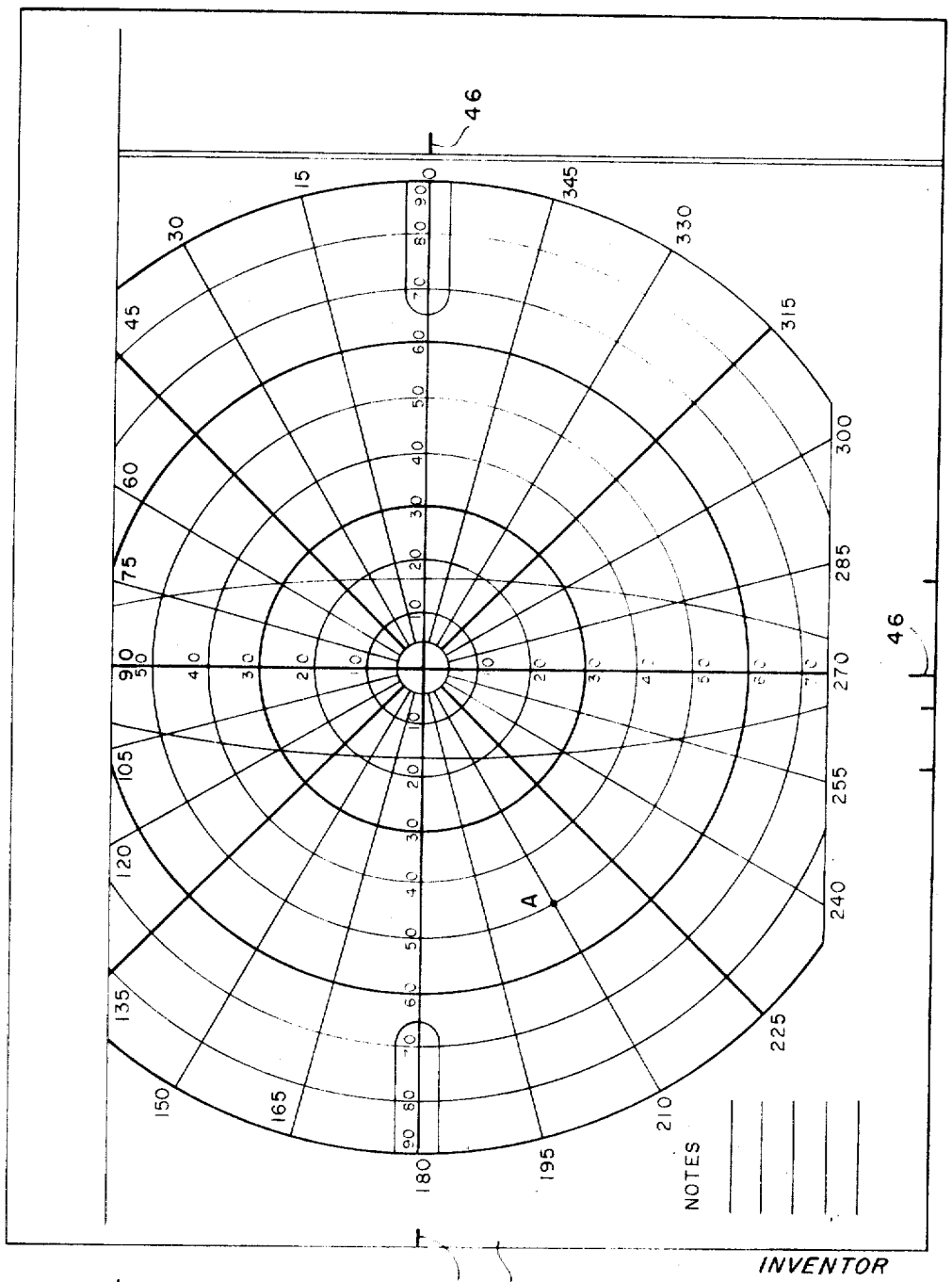
FIG. 4 shows a chart of the type suitable for use with the Goldmann perimeter machine.

It will be appreciated that the foregoing description of the Goldmann perimeter is not intended to be complete as the apparatus is an extremely complex machine. However, as the Goldmann perimeter is an apparatus well known to those skilled in the art, additional description of the apparatus is not deemed necessary. A chart typically used with the Goldmann perimeter is shown in FIG. 4 of the drawings. The chart 45 is typically of letter size and has markings 46 along three of its edges to be used in positioning the chart in the chart holder 2. The chart itself is of circular configuration with polar coordinates marked thereon at 15 degree intervals. The chart also includes a plurality of concentric circles which indicate the angle between the axis of fixation and a line to a particular point along one of the radially extending lines. Using the two sets of coordinates, any point on the surface 44 of the hemisphere 3 can be located. When the chart 45 is properly positioned in the chart holder and the pointer 46 is positioned at a particular point on the chart 45 such as point A, the spot will be displayed at a corresponding point on the surface 44 when switch 30 is operated. The intensity of the light will be determined by the levers 27 and 28 which control the filters 9 and 10 and the size of the spot will be controlled by the lever 29 which controls diaphragms 11.

Figure 5:
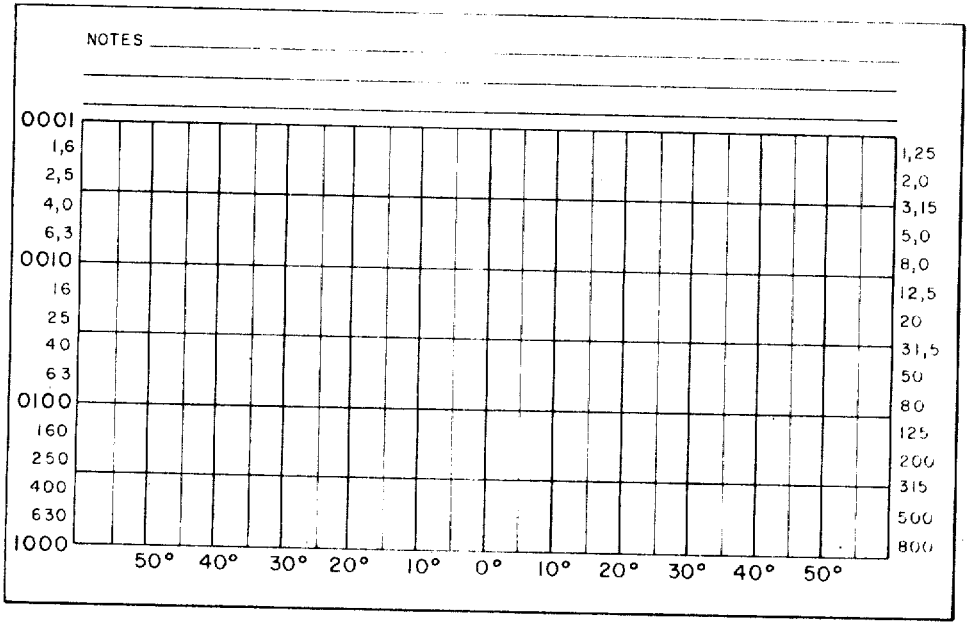
FIG. 5 shows another form of chart, a card, used in plotting visual field test data.
Figure 6:
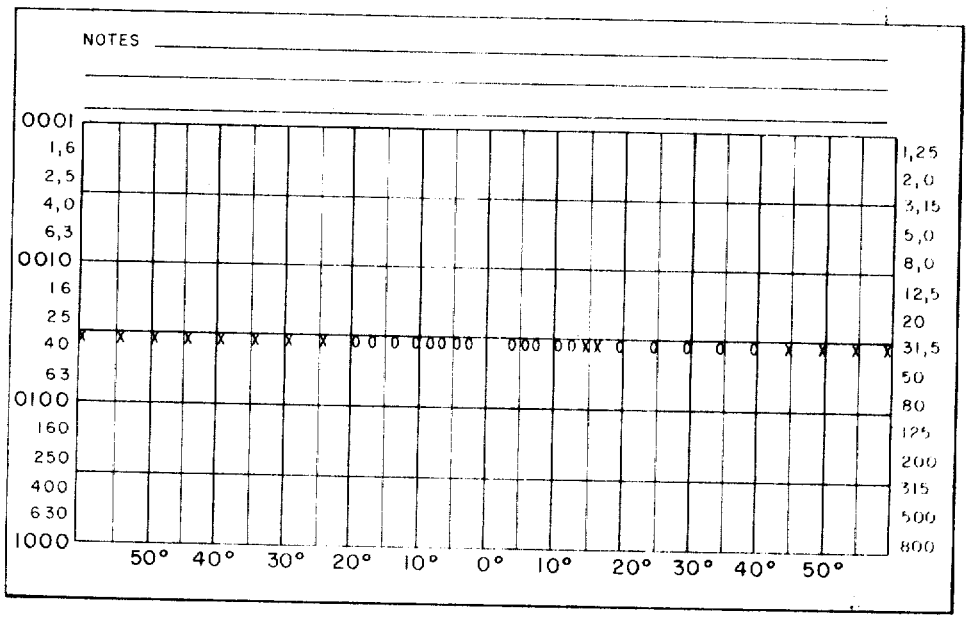

There is shown in FIG. 5 of the drawings, a card suitable for recording data obtained using the improved testing procedure of the present invention and which is useful for the purpose of determining the intensity of light to be presented subsequently at various locations. The card 5 has indicia thereon providing a graph in which angular displacement is plotted along the X axis and logarithmically decreasing light intensity is plotted along the Y axis.

To practice the method of the present invention using the apparatus shown in FIGS. 1 through 3, of the drawings, the subject is positioned as shown in FIGS. 1 and 2. Thus, the subject's head is placed in position on the chin rest 16 with the head band 15 assisting in holding the subject's head stable. Adjustment knobs now shown are utilized for positioning the chin rest and head band such that the subject's eye 38 under test is directly along the axis of the telescope 4. The point of fixation of the eye, that is the point to which the eye is most directly focussed, should correspond to point 5. Telescope 4 can be used for determining when the point of fixation of the eye is on the point 5.

The lens holder 50 is then positioned adjacent the eye of the subject and suitable lenses inserted in the lens holder to provide refracted correction of the eye of the subject under test condition. The lens used preferably have small rims. The initial lenses used are those indicated by a recent refraction corrected for age as indicated in Table 1 below:

TABLE 1

| Age: | Recommended addition |
|---|---|
| 30–39 | +0.50 |
| 40–44 | +1.00 |
| 45–49 | +1.50 |
| 50–54 | +2.25 |
| 55–59 | +3.00 |
| 60+ | +3.50 |

Any cylinder under one diopter is included only as its spherical equivalent. It is desirable to transcribe the cylindrical prescription after the addition for age and then choose the prescription with lower spherical power in order to minimize spherical lens distortion. After the initial lens is chosen, the subject should preferably be provided with the choice of one-half diopter plus and minus spheres over the calculated correction, modifying the spherical power until the subject indicates that the plus or minus spheres make no appreciable difference.

It is important to note that Table 1 above is for the Goldmann perimeter providing correction for both age and distance. If the distance from the subject's eye to the test field is different, different tables known in the art would be used as it is important to provide refracted correction of the eye of the subject under the test conditions.

Psychological variables represent a very large part of the problems causing inconsistent test results. A short learning process is very helpful in preventing the inconsistent test results and it is necessary that the subject maintain the point of fixation of the eye under test on the point 5 in order to obtain good test results.

Fixation is influenced to a great degree by distractions and anxiety. Thus, distractions and interruptions during the test should be avoided or minimized. In order to reduce anxiety, it is desirable to avoid presenting spots in the same area without presenting it elsewhere. When a long period of time elapses between presentation of spots received by the subject, many subjects develop additional anxiety. It is preferable to present spots which will be perceived by the subject when a sequence of spots presented are not perceived over a period of time that may produce anxiety.

Prior to recording data, it is desirable to adjust levers 27, 28 and 29 to provide spots of desired size and initial desired light intensity. Using the pantograph 26 and the shutter switch 30, momentary spots of light are presented on the test field at random locations in order that the subject can learn the size, brightness and duration of the test. By orienting the subject initially and not recording the first few responses, some learning by the subject can be accomplished without causing inconsistent test results.

After the short learning period, recording of data is commenced. Momentary spots of light of predetermined stimulus value are presented at predetermined locations on the test field in a sequence in which the spots are not sequentially presented at the same location. It is important that the spots not be sequentially presented at the same location to prevent bleaching of the retina. Preferably, the spots are presented throughout the test in a sequence which is not predictable by the subject and which is suitably a random sequence. The time interval between presentation of spots should be sufficient to permit the subject's eye to re-fixate. The time intervals are preferably of variable but relatively brief duration if directional subject response is not provided.

It will be noted that the stimulus value of the light spots is a function of size of the spot, duration, and intensity of the light for a constant level of brightness of the test field. It is important that the test field be maintained at a constant level of illumination if good results are to be obtained. A spot size of approximately 0.25 square millimeter is suitable although spots of different size can be used. The duration of the spot should be at least 100 milliseconds, and preferably at least 200 milliseconds, if the duration of the spot is not to affect substantially the stimulus value. When using the apparatus shown in FIGS. 1 through 3 of the drawings, the duration of the spot size is controlled by the time that the switch 30 is operated by the technician performing the test.

In accordance with the preferred embodiment of the invention, the spot size is maintained constant, the duration of the spot is at least 100 milliseconds, and the stimulus value of the spots is varied by controlling the intensity of the light. Preferably, each spot presented is of a stimulus value selected from a plurality of pre-selected, discrete stimulus values as determined by discrete levels of light intensity relative to the luminance of the background, which is suitably 31.5 apostilbs. In accordance with the specific example shown, the filter 9 and 10 are controllable by levers 27 and 28 to provide thirty-one discrete levels of light intensity ranging from one to one thousand apostilbs in intensity above the luminance of the test field with each of the steps being different by 0.1 log unit.

In accordance with the specific example of the invention described herein, information is obtained as to 32 points along one of the axes, such as the 0–180° axis, of the chart of FIG. 4. It will be appreciated, in this regard, that data can be taken along as many of the different axes as desired in order to obtain sufficient data to plot a definitive chart. For this purpose, it will generally be satisfactory if similar data were taken along each of the different axes shown, although acceptable data could be obtained if only the axes spaced apart by 30° are used. However, it would be redundant to show the entries on more than one of the cards as shown in FIG. 5 although one of the charts of FIG. 5 would be associated with data taken along each one of the axes. It is preferable when data is desired along more than one axis to accumulate data along all axes of interest in a single group, providing a more unpredictable presentation.

Turning now to FIGS. 6 through 10 of the drawings, there is shown an exemplary manner in which the threshold of various points along each of the axes can be determined, with the size of the spots being constant and the duration of the spots being at least 0.100 millisecond. The initial run is selected to be at an added light level of 31.5 apostilbs (3.15 millilamberts). The selected locations shown on the charts of FIGS. 6 through 10 are those appearing at increasing intervals away from the point of fixation along the 0–180° axis. Levers 27 and 28 would be adjusted to provide a spot of desired intensity. Thereafter, for example, the pointer 46 could be positioned left of the point of fixation at the intersection of the 0–180° axis with the circle designating 30° displacement from the point of fixation. When switch 30 is operated, a spot momentarily appears on the test field 44. When the subject perceives a stimulus, he orally indicates the approximate location relative to point 5. If a spot was not presented at that location, the response is ignored for purposes of recording data and, preferably, the subject is informed of the incorrect response. If the spot was perceived at the proper location, a circle is indicated on the card at the point 30° to the right. If a spot presented was not perceived, an X is entered as indicated on the 30° displacement to the left location on card 6.

Figure 11:
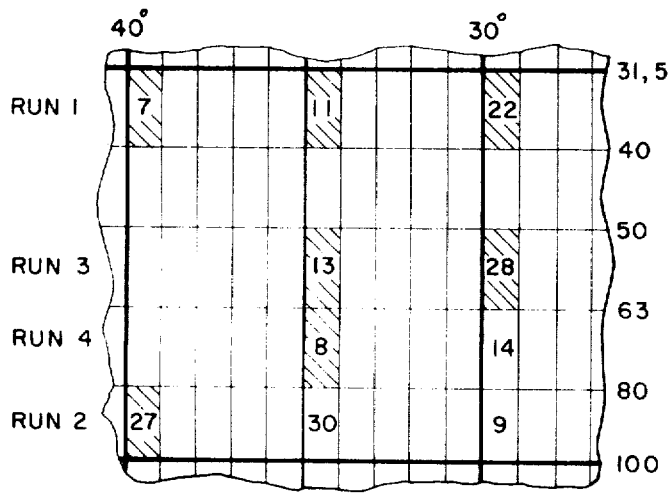

For a better understanding of the method, there is shown in FIG. 11 a portion of a card in larger scale and the numerical sequence in a particular run which the spot is presented at a particular location is indicated numerically, with the background of the numeral being shaded to indicate that no spot was seen. Thus, as shown in FIG. 11, the seventh spot of run 1 was at the 40° left position, the eleventh was at the 35° left position and the twenty-second spot was presented at the 30° left position. The shaded background of each numeral indicates that none of the three spots were seen. It is important to note, however, that it is not necessary to indicate on the card the numerical sequence and that FIG. 11 is intended to be explanatory.

Figure 7:
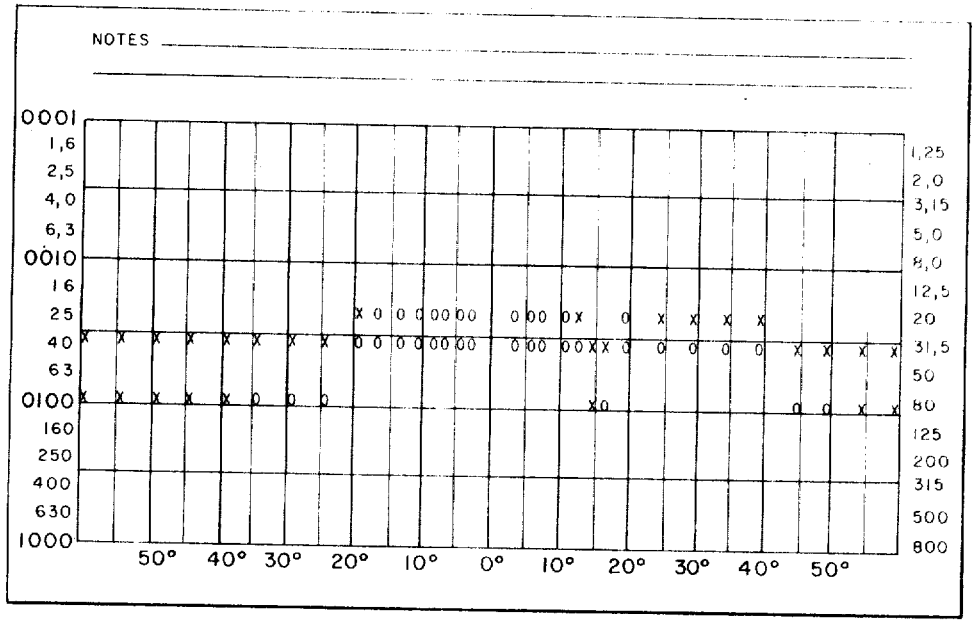

After completion of the first run, the second run is accomplished as shown in FIG. 7 of the drawings. Thus, a light spot having an intensity of 80 apostilbs is projected onto each location where the target was not previously perceived, 80 apostilbs being four discrete steps greater in intensity than 31 apostilbs where each discrete step is 0.1 log unit. A target of 20 apostilbs intensity is projected onto each location where the target was previously perceived. It will be noted that 20 apostilbs is two discrete steps less intense than the spot perceived. Referring to FIG. 11, it can be seen that the ninth spot projected in run No. 2 was at the 30° left position and seen, the 27th projected 40° to the left was not seen and the 30th spot which was projected 35° to the left was seen.

Figure 8:
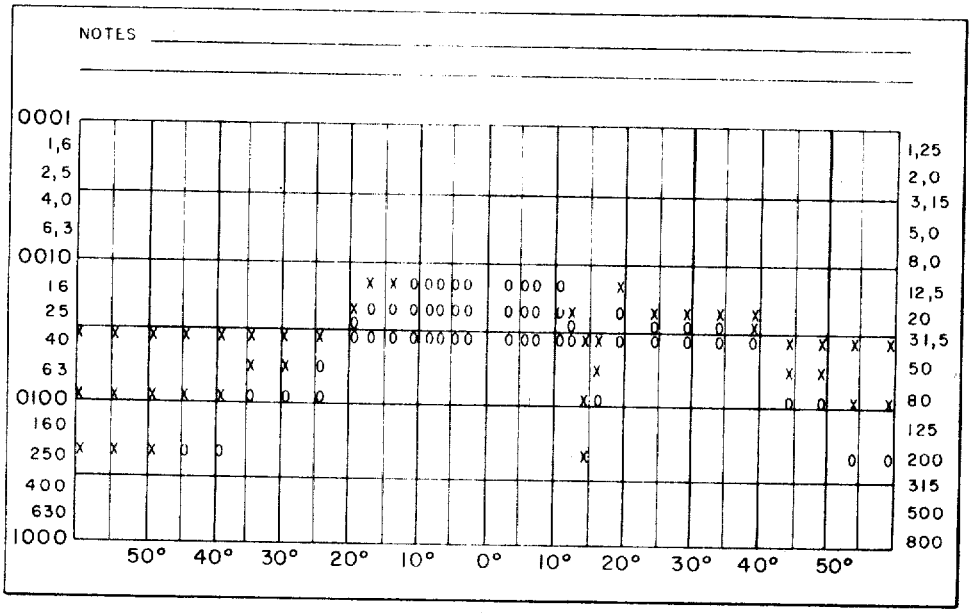

Referring now to FIG. 8 of the drawings in run No. 3, the above described process of projecting on to each location in a random sequence a light spot having an intensity 4 steps greater when the target was not seen and two steps less when the target was seen was repeated. However, at locations such as 20° left, 12° right, 25° right, 30° right, 35° right and 40° right, where at least one spot previously presented was seen and one spot previously presented was not seen, the spot presented is the mean stimulus value of the dimmest spot seen and the brightest spot which was not seen. Since only two steps separate the two previous stimulus values, change of intensity required only one step. Thus, at each of these locations, a spot having an intensity of 25 apostilbs was presented and it was determined that all locations except 40° right the threshold level was 20 apostilbs and at the 40° right location the threshold level was 25 apostilbs, where the threshold level is defined as the dimmest spot seen.

Referring again momentarily to FIG. 11, it can be seen that in run No. 3, trials 28 and 13 were projected onto the 30 and 35° right locations respectively and that neither of these trials was seen. It can also be seen that only two steps separate intensity levels at which the target was seen and not seen at these particular locations. Accordingly, in run 4 the 14th and 8th trials were presented at the 30° and 35° left locations respectively at a level of 63 apostilbs. This revealed the threshold level of the 30° left location to be 50 apostilbs and the threshold level at the 35° left position to be 63 apostilbs. In similar fashion, as is indicated in FIG. 9, additional stationary momentary spots of light were presented at each of the locations in an unpredictable sequence with the spots presented in run 4 being of stimulus values based upon the subject's responses to previous spots of light at the same locations. It will be noted, in this regard, that at the end of run 4, the normal blind spot along the 15° right location has been defined and the subject has perceived the stimulus at each of the other 32 locations. It is noteworthy in this regard that in run 4 only 26 trials were required and at the conclusion of run 4, the threshold of 15 locations had been determined.

In FIG. 10 of the drawings, there is shown entries made in the course of runs 5, 6 and 7. In run 5, seventeen trials were required resulting in six thresholds. Eleven trials were required in run 6 which resulted in nine thresholds and in run 7, two trials were required, resulting in two thresholds. Thus, after completion of seven runs, either the limits of the apparatus were reached, as at the 15° right location where the normal blind spot exists, or a threshold level was determined for each location.

The information displayed on the card as shown in FIG. 10 provides valuable information. However, more detailed information can be obtained by using data obtained for plotting curves or graphs to display the information in a form which is readily understood by the clinician such as the isopter curves as shown in FIG. 12 of the drawings. For example, the location of blind spots and the closeness of the isopters provides very valuable information to the diagnostician and surgeon. In addition, comparison of charts made as a result of tests made at different times is important as it can reveal whether a particular disease is progressing or being cured.

Although the method of the present invention can be practiced manually using a perimeter machine as described, it can most advantageously be employed in connection with a computer which is programmed to perform the required record keeping, select the order in which spots are presented at selected locations and control spot size and intensity in accordance with the subject's responses to spots previously presented at the same locations.

Figure 13:
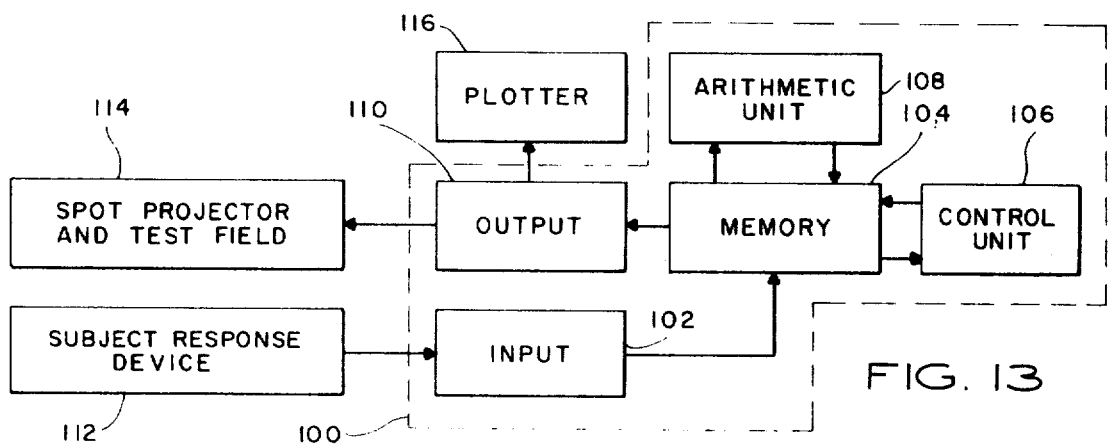

Referring to FIG. 13 of the drawings, there is indicated a programmable general purpose computer 100 comprising an input unit 102, a memory 104, control unit 106, an arithmetic unit 108, and an output unit 110. A subject response device 112 is connected to the input unit 102. The subject response device 112 is operable by the subject being tested to indicate when the subject perceives a spot provided by a spot projector and test field 114.

The spot projector and test field 114 is controlled by signals from the output 110 of the computer 100. Many different types of apparatus can be utilized as the spot projector and test field 114. For example, the perimeter described in FIGS. 1–3 could be utilized with appropriate servo mechanisms for controlling the position of the projector in accordance with output signals from the computer 100. A cathode ray tube controlled by the output signals from the computer is especially adaptable for use with the computer. Other suitable spot projector and test fields would be those embodying light emitting diode arrays and galvanometer operated optical devices. It is only necessary that the spot projector and test field be capable of providing spots of light of a plurality of predetermined discrete stimulus values at a plurality of preselected locations on the test field.

The computer is programmed to operate the spot projector and test field 114 to cause a spot of selected stimulus value to appear at each of the predetermined locations in a desired sequence. The desired sequence is preferably one which is not readily predictable by the subject and may be a random sequence. It will be noted, in this regard, that it is well known in the art to program a computer to provide a random sequence output.

The computer is also programmed to be responsive to information obtained from the subject response device and present additional stationary momentary spots of light at each of the predetermined locations until at each location either the limit of the apparatus is reached or a threshold level is determined. The stimulus value of each of the additional spots of light is different from the stimulus values of spots of light previously presented to the subject at the particular location by a predetermined amount depending upon the subject's response to the spots of light previously presented at that location. Thus, it is practical to program the computer such that if a spot has not been perceived at the particular location, each time that a spot is presented at that location it will be of greater stimulus value by a predetermined number of discrete steps, such as four, until a spot is perceived at that location or the limits of the apparatus is reached. On the other hand, if each spot of light presented at the location was perceived, each spot of light presented thereafter at that location will be of a stimulus value which is less by a predetermined number of discrete steps, such as two, until a spot is not perceived or the limit of the apparatus is reached. Once one spot has been perceived and another spot of light has not been perceived at the particular location, spots of light presented thereafter at that location will be of a stimulus value which is the mean between the lowest stimulus value perceived and the highest stimulus value not perceived. Additional spots having a stimulus value selected as described above will be presented until the threshold level for that location is determined.

The computer is also programmed to provide at the conclusion of a test, information as to the test results. This information can be provided by causing isopter curves to be drawn using a plotter 116, for example. Alternatively, information can be printed out in tabular form or, if the test field is a cathode ray tube, a momentary display of curves or threshold spots resulted from the test can be displayed on the spot projector and test field.

From the foregoing, it can be seen that the present invention provides an improved method for testing visual fields. The method can be practiced manually on different types of perimeter devices or can be accomplished under logical control provided by either a special purpose computer or a properly programmed general purpose computer. Although the invention has been described with reference to particular preferred embodiments thereof, many changes and modifications will become apparent to those skilled in the art in view of the foregoing description which is intended to be illustartive and not limiting of the invention defined in the appended claims.

What is claimed is:

1. A method for testing the visual field of a subject that comprises the steps of:
   (a) selecting a group of stimulus values of different levels to be presented to a subject, each stimulus value of said group being noticeably different from any other of said group, some of said stimulus values being of levels not seen by a normal subject and most of said stimulus values being of levels which are seen by a normal subject;
   (b) presenting to a subject stationary, momentary spots of light of predetermined stimulus values selected from said group at different predetermined test locations on a test field oriented relative to the subject's direction of gaze and in a test location sequence not predictable by the subject, the stimulus value of each spot first presented at each location being neither the highest nor the lowest of said group and of levels such that some spots will be seen and some will not be seen by a normal subject;
   (c) obtaining from the subject information as to whether the subject received a stimulus as each spot is presented;
   (d) presenting to the subject at each of said predetermined locations at least one additional stationary, momentary spot of light in a location sequence not predictable by the subject and obtaining from the subject information as to whether the subject received a stimulus as each additional spot of light was presented;
   (e) retaining pertinent information with respect to spots presented at each location as to the highest stimulus value presented at said each location which did not act as a stimulus and the lowest stimulus value at said each location which did act as a stimulus; and
   (f) controlling the number of additional spots presented to the subject at each location and the stimulus value of said additional spots of light presented based upon the pertinent information retained respecting any previous spots of light presented at said locations until at each locations there is presented a spot which is of the lowest stimulus value from said group that did act as a stimulus to the subject and a spot which is of the greatest stimulus value from said group that did not act as a stimulus to the subject.

2. A method as defined in claim 1 wherein the stimulus value of said spots is controlled by varying at least one of the size of the spot, the light intensity and the spot duration.

3. A method as defined in claim 1 wherein each of said momentary spots is of at least 100 millisecond duration and the stimulus value is controlled by varying at least one of the spot size and the light intensity.

4. A method as defined in claim 1 wherein the time interval between presentation of spots at a location is at least sufficient for the subject to refixate.

5. A method as defined in claim 4 wherein the time intervals are variable.

6. A method as defined in claim 1 wherein spots are presented which will be perceived when a sequence of spots presented are not perceived over a period of time that may produce anxiety of the subject.

7. A method as defined in claim 1 further including the step of providing subjectively obtained refractive correction of the eye of the subject under the test conditions.

8. A method as defined in claim 1 wherein each of the spots is of constant size and of a duration of at least 200 milliseconds and the stimulus value is controlled by varying the light intensity.

9. A method as defined in claim 1 further including the steps of increasing the stimulus values of additional spots presented at those locations at which the initial spot of light did not act as a stimulus by a first predetermined number of levels until there occurs one of a spot acts as a stimulus in the subject and the maximum stimulus value of said group is presented without acting as a stimulus; decreasing the stimulus values of additional pots presented at those locations at which the initial spot of light acted as a stimulus by a second predetermined number of levels until there occurs one of a spot does not act as a stimulus to the subject and the minimum stimulus value is presented and acts as a stimulus, and presenting at each location at which one spot acted as a stimulus and a different spot did not act as a stimulus additional spots of light at said location of stimulus levels which are the mean between the highest level which did not act as a stimulus and the lowest level which did act as a stimulus until there is presented at the location two spots whose stimulus values are from said group and of adjacent levels, one of said two spots not acting as a stimulus and the other of said two spots acting a a stimulus to thereby establish a threshold level.

10. A method as defined in claim 1 further including the step of controlling the stimulus value of predetermined spots presented at each location at which a spot of a higher stimulus value did act as a stimulus and a spot of lower stimulus value did not act as a stimulus to be of stimulus levels between the highest stimulus value which did not act as a stimulus and the lowest stimulus value which did act as a stimulus until at such location there is presented two spots of adjacent levels, one of which acted as a stimulus and the other of which did not act as a stimulus.

11. A method as defined in claim 9 wherein said first and second numbers are even and said first number is an integral multiple of the second.

12. A method as defined in claim 9 wherein said test field is illuminated at a constant level and said stimulus values are a function of light intensity levels relative to the illumination of said test field.

References Cited

UNITED STATES PATENTS

| | | | |
|---|---|---|---|
| 1,903,502 | 4/1933 | Campbell | 351—24 |
| 1,942,850 | 1/1934 | Tillyer | 351—24 |
| 2,441,031 | 5/1948 | Papritz | 351—24 |
| 3,269,792 | 8/1966 | Mirsky | 351—23 |
| 3,414,348 | 12/1968 | Gambs | 351—24 |
| 3,416,857 | 12/1968 | Lookabaugh | 351—39 |
| 3,421,498 | 1/1969 | Gans | 351—24 |
| 3,515,466 | 6/1970 | Apple | 351—23 |

DAVID SCHONBERG, Primary Examiner

P. A. SACHER, Assistant Examiner

U.S. Cl. X.R.

351—23, 24, 36, 37